Nov. 11, 1958
D. D. ROVICH
2,859,486
BUILDING SPACER
Filed Aug. 17, 1953
2 Sheets-Sheet 1
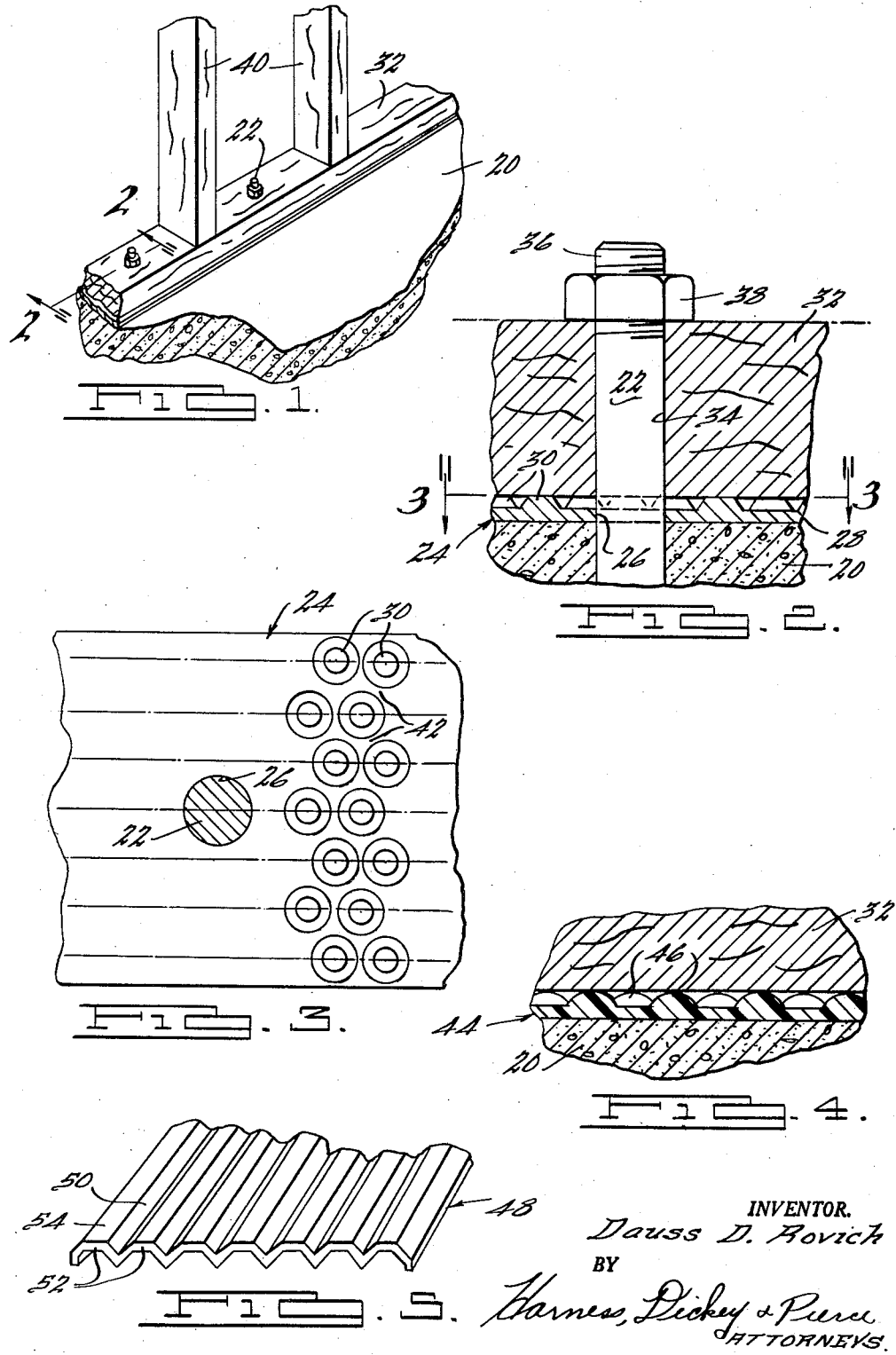
INVENTOR.
Dauss D. Rovich
BY
Harness, Dickey & Pierce
ATTORNEYS.

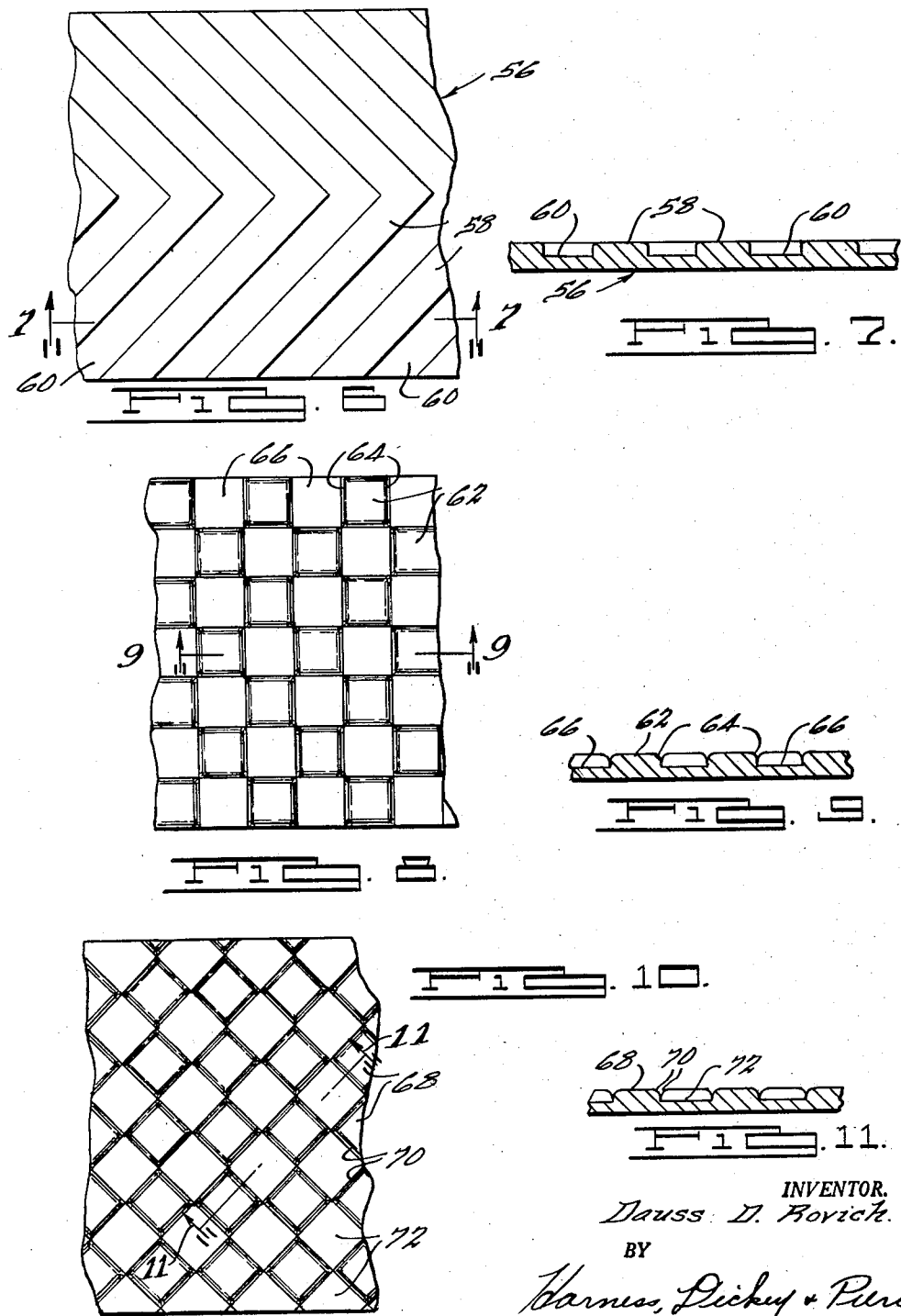

United States Patent Office 2,859,486
Patented Nov. 11, 1958

2,859,486

BUILDING SPACER

Dauss D. Rovich, Detroit, Mich.

Application August 17, 1953, Serial No. 374,627

1 Claim. (Cl. 20—.5)

This invention relates generally to wall constructions and, more particularly, to the construction of walls for a garage, a ranchhouse or other like no-basement type buildings.

In the ordinary wall construction for buildings of the indicated character, the sill plates which support the side and end wall studs are usually wooden members secured directly to a cement floor or the like. The sill plates are vulnerable points in a wall construction of this type in view of the fact that the floors often become wet and that some of the water is absorbed by the sill plates. The water so absorbed causes the sill plates to have a tendency to decay and rot out which results in sagging and buckling of the walls.

The primary object of the present invention is to provide improved means for substantially eliminating the tendency of the sill plates of building walls of the indicated character to decay and rot out when exposed to moisture as from wet floors. The present invention provides a non-corrosive building spacer adapted to be disposed directly on a cement floor or the like and which is provided with a plurality of upwardly extending projections on the top face thereof on which a sill plate may be positioned. The spaces between the upwardly extending projections provide a plurality of circuitous passageways under the sill plate through which the air may circulate to prevent the same from rotting out. The upwardly extending projections are preferably staggered so that no direct air flow is provided and, to cut down any draft effect while still permitting the air to flow around said projections. The building spacer may be made of brass, lead, or any other non-corrosive material.

The projections on the spacer may be shaped as desired, as for example, conically or cylindrically shaped.

Other objects, features and advantages of the present invention will become apparent from the following detailed description taken in conjunction with the accompanying drawings in which:

Figure 1 is a fragmentary perspective view of a garage wall construction provided with a building spacer made in accordance with the principles of the invention;

Figure 2 is a fragmentary sectional view of the structure illustrated in Fig. 1, taken along the line 2—2 thereof;

Figure 3 is a view, partly in section and partly in elevation, of the structure illustrated in Fig. 2, taken along the line 3—3 thereof;

Figure 4 is a fragmentary sectional view, similar to Fig. 2, and showing a modified building spacer;

Figure 5 is a fragmentary perspective view of a second modification of the building spacer;

Figure 6 is a fragmentary plan view of a third modification of the building spacer;

Figure 7 is a sectional view of the structure illustrated in Fig. 6, taken along the line 7—7 thereof;

Figure 8 is a fragmentary plan view of a fourth modification of the building spacer;

Figure 9 is a sectional view of the structure illustrated in Fig. 8, taken along the line 9—9 thereof;

Figure 10 is a fragmentary plan view of a fifth modification of the building spacer; and Figure 11 is a sectional view of the structure illustrated in Fig. 10, taken along the line 11—11 thereof.

Referring now to the drawings and, particularly, to Figs. 1, 2 and 3 thereof, the numeral 20 designates a cement floor of a building such as a garage or the like. Disposed along the outer edge of the floor 20 are a number of upwardly extending anchor bolts 22. A longitudinally extending corrosion resistant spacer 24, having a plurality of apertures 26, is disposed along the outer edge of the cement floor 20 with the apertures 26 adapted to receive the anchor bolts 22. As is best seen in Figs. 2 and 3, the spacer 24 comprises a lower solid section 28, the upper face of which is provided with a plurality of staggered upwardly extending bosses or projections 30 which are shaped in the form of a truncated cone. A sill plate or wooden two-by-four 32 is disposed along the upper face of the spacer 24 and is provided with a plurality of apertures 34 adapted to receive the anchor bolts 22. The upper ends of the anchor bolts 22 are threaded as at 36 and are provided with nuts 38 adapted to securely clamp the sill plate 32 against the upper face of the spacer 24. The upper face of the sill plate 32 is adapted to have mounted thereon conventional wall studs 40.

As is best seen in Figs. 2 and 3, when the sill plate 32 absorbs moisture, the staggeredly positioned projections 30 provide a number of indirect air passages, as at 42, which allow the air access to the undersurface of the sill plate to prevent the accumulation of moisture and subsequent decay of the sill plate. The spacer 24 may be made by any suitable method such as by rolling, but it is preferably made by a casting method.

In Fig. 4 is shown a modified spacer 44 including the features of the invention and which is preferably made from a suitable thermoplastic material. The spacer 44 has a plurality of upwardly extending projections or bosses 46 similar to the bosses 30 of the spacer 24, but being shaped in the form of a hemisphere. In operation, spacer 44 functions in a manner similar to spacer 24.

In Fig. 5 is shown another modified spacer 48 comprising a plurality of inverted U-shaped lands or ridges 52 adjacently disposed and having a longitudinally extending groove 50 between each land. The spacer 48 is especially adapted to be used where it is desired to stop any drafts from coming into the building while providing access to the air under the sill plate of the wall. The aforementioned is accomplished by positioning the spacer 48 so that the lands 52 are disposed lengthwise of the sill plate. Each of the lands 52 is provided with an upper horizontal surface 54 on which the sill plate rests.

In Figs. 6 and 7 is shown another modified spacer 56 in which the upwardly extending projections or bosses 58 comprise a plurality of longitudinally spaced, raised V-shaped lands, having the points thereof disposed on the longitudinal centerline of the spacer. Spacer 56 functions as did the previously described spacers, but as is best seen in Fig. 6, the air spacers 60 are also V-shaped which prevents any direct draft from entering the building.

In Figs. 8 and 9 is illustrated another modified spacer in which the upwardly extending projections comprise a plurality of staggered cube-shaped lands 62. The upper edges of the cube-shaped lands 62 are rounded off as at 64 to provide passageways for the air between the staggered air spacers 66. It will be seen that the staggered air spacers 66 provide indirect paths for letting the air under the sill plate of a wall construction but prevents any direct draft thereunder.

In Figs. 10 and 11 is shown a further modified spacer having a plurality of staggered upwardly extending projections 68 which are cube-shaped and similar to the projections 62 of the spacer shown in Figs. 8 and 9. The upper edges of the projections 68 are rounded off as at 70 to provide communication between the spacers 72 between the projections 68. The only difference between the spacers of Figs. 8 and 10 is that the projections 62 of Fig. 8 are disposed in a longitudinal pattern while the projections 68 of Fig. 10 are disposed in a diagonal pattern.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

What is claimed is:

In a garage wall construction, the combination of, a concrete floor, the outer edge of said floor being provided with a plurality of upwardly extending anchor members, a longitudinally extending corrosion resistant spacer disposed along said outer edge of the floor and having apertures for passage therethrough of said anchor members, the upper face of said spacer being provided with a plurality of upwardly extending projections forming a plurality of circuitous passageways communicating the exterior of said wall construction with the interior thereof, a sill plate disposed on said projections and provided with apertures for passage therethrough of said anchor members, and fastening means adapted to engage said anchor members to rigidly hold said sill plate and spacer in place on said floor.

References Cited in the file of this patent

UNITED STATES PATENTS

| | | |
|---|---|---|
| 718,823 | Darlington | Jan. 20, 1903 |
| 970,555 | Riley | Sept 20, 1910 |
| 1,628,090 | Weiss | May 10, 1927 |
| 2,297,058 | Hasenburger et al. | Sept. 29, 1942 |
| 2,410,922 | Balduf | Nov. 12, 1946 |
| 2,689,987 | Berger | Sept. 28, 1954 |

FOREIGN PATENTS

| | | |
|---|---|---|
| 109,720 | Germany | Apr. 24, 1898 |